United States Patent [19]

Horiguchi

[11] 4,327,404

[45] Apr. 27, 1982

[54] DC POWER SUPPLY CIRCUIT

[75] Inventor: Michiyuki Horiguchi, Nara, Japan

[73] Assignee: Sharp Kabushiki Kaisha, Osaka, Japan

[21] Appl. No.: 185,873

[22] Filed: Sep. 9, 1980

[30] Foreign Application Priority Data

Sep. 18, 1979 [JP] Japan ............................ 54-129508[U]

[51] Int. Cl.³ .......................................... H02M 3/335
[52] U.S. Cl. ....................................... 363/19; 363/21; 363/97
[58] Field of Search ............... 331/112; 363/19, 21, 363/97

[56] References Cited

U.S. PATENT DOCUMENTS

| | | | |
|---|---|---|---|
| 3,134,940 | 5/1964 | Massey et al. | 363/19 |
| 3,523,235 | 4/1970 | Schaefer | 363/19 |
| 4,208,705 | 6/1980 | Hosoya | 363/19 |

Primary Examiner—William M. Shoop
Attorney, Agent, or Firm—Birch, Stewart, Kolasch & Birch

[57] ABSTRACT

A DC power supply circuit includes a blocking oscillator circuit of the transistor saturation type, an error detection circuit for detecting difference between an output voltage level and a preselected reference level, and a control circuit. At the start of the circuit operation, the blocking oscillator circuit is controlled in the self oscillation mode, and thereafter, controlled in the separate excitation mode. The control circuit responds to an output signal of the error detection circuit and functions to lengthen an ON period of a switching transistor included in the blocking oscillator circuit when the output voltage level is lower than the preselected reference level. Contrarily, when the output voltage level is higher than the preselected reference level, the ON period of the switching transistor is shortened.

5 Claims, 5 Drawing Figures

DC POWER SUPPLY CIRCUIT

BACKGROUND AND SUMMARY OF THE INVENTION

The present invention relates to a power supply circuit which intermittently produces a DC power source voltage by periodically switching a switching element and smoothing the thus produced voltage, thereby obtaining a DC voltage of a predetermined level.

There are two types of DC-DC converters, namely, the self oscillation type and the separate excitation type. The self oscillation type has a simple construction but an obtained voltage does not show satisfying stability. The separate excitation type shows a stable operation but a control circuit thereof is complicated.

Accordingly, an object of the present invention is to provide a novel DC power supply circuit.

Another object of the present invention is to provide a DC power supply circuit which has the advantages of the self oscillation type and the separate excitation type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a switching system is employed wherein the self oscillation type operation is conducted at the start of circuit operation, and, thereafter, the separate excitation type operation is conducted to stabilize the output voltage.

In a preferred form, a switching transistor is driven, at the start of the circuit operation, in the self oscillation mode. An output voltage level is compared with a preselected reference level so that an ON period of the switching transistor is shortened when the output voltage level is higher than the preselected reference level, and the ON period of the switching transistor is lengthened when the output voltage level is lower than the preselected reference level. Therefore, the output voltage level is stabilized and the ripple is minimized. Moreover, the circuit construction is simplified as compared with the conventional separate excitation type circuit.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

A DC power supply circuit of the present invention comprises a blocking oscillator circuit 10 of the transistor saturation type, an error detection circuit 40 for detecting the difference between an output voltage level and a preselected reference level, and a control circuit 70.

Figure 2:
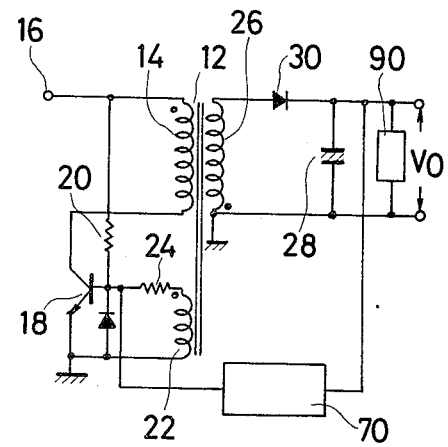
FIG. 2 is an equivalent circuit diagram of a blocking oscillator circuit included in the DC power supply circuit of FIG. 1.

The blocking oscillator circuit 10 comprises, as shown in FIG. 2, a converter transformer 12 of which a primary winding 14 is connected to a DC power source terminal 16. A switching transistor 18 is disposed so that the collector electrode thereof is connected to the primary winding 14 of the converter transformer 12. A starter circuit including a resistor 20 is disposed between the base electrode of the switching transistor 18 and the DC power source terminal 16. The base electrode of the switching transistor 18 is also connected to a feedback winding 22 of the converter transformer 12 via a resistor 24.

A secondary winding 26 of the converter transformer 12 functions to develop an output voltage $V_0$ of a fixed level when the primary winding 14 is connected to the DC power source terminal 16. The secondary winding 26 is connected to a smoothing condenser 28 via a diode 30. The output voltage $V_0$ is applied to a load 90.

When starting the operation, the blocking oscillator circuit 10 operates in the self oscillation mode. More specifically, the switching transistor 18 is placed in the active region via the resistor 20. The collector current gradually flows and, therefore, a current begins to flow through the primary winding 14 of the converter transformer 12. Accordingly, a current flows through the feedback winding 22, which functions to place the switching transistor 18 into the saturation region from the active region. When the switching transistor 18 is placed in the saturation region, the current flowing through the primary winding 14 is maintained at a fixed value and, therefore, substantially no magnetic flux appears across the feedback winding 22. Accordingly, the switching transistor 18 is suddenly switched off. With this switching off operation of the switching transistor 18, the magnetic energy temporarily stored in the secondary winding 26 is developed toward the load 90 through the smoothing condenser 28 and the diode 30. When the magnetic energy is completely consumed by the load 90, the switching transistor 18 is switched on as in the case of the above-mentioned starting operation to provide the electric current through the primary winding 14.

The above-mentioned operation is repeated to repeatedly switch the switching transistor 18, whereby a DC voltage $V_0$ of a preselected level is obtained across the smoothing condenser 28. Accordingly, when the base current of the switching transistor 18 is controlled by monitoring the output voltage $V_0$, the output voltage $V_0$ can be stabilized to show the constant voltage feature. This control is performed by the error detection circuit 40 and the control circuit 70.

Figure 1:
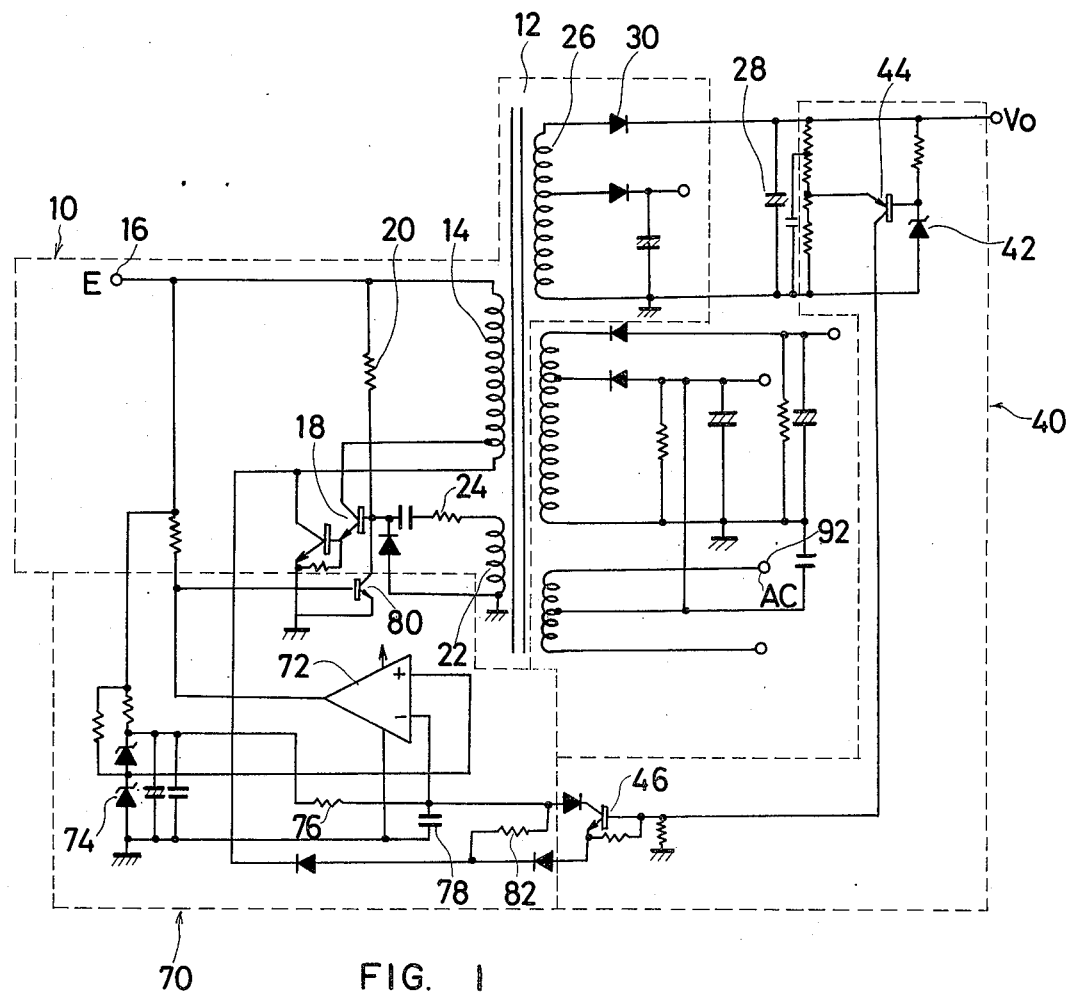
FIG. 1 is a circuit diagram of an embodiment of a DC power supply circuit of the present invention.
Figure 3:
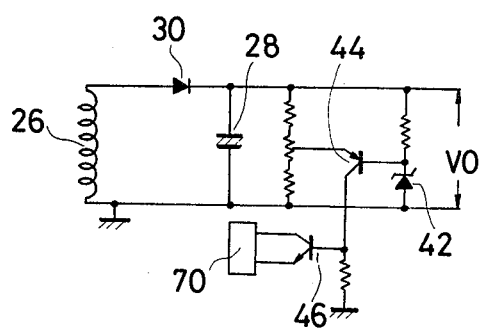
FIG. 3 is an equivalent circuit diagram of an error detection circuit included in the DC power circuit of FIG. 1.

The error detection circuit 40 comprises, as shown in FIG. 3, a constant voltage diode (Zener diode) 42 for determining a first reference voltage level. The output voltage $V_0$ is compared with the first reference voltage determined by the constant voltage diode 42, and the comparison error is amplified by transistors 44 and 46.

The transistor 46 controls the operation of the control circuit 70 which will be described hereinbelow.

Figure 4:
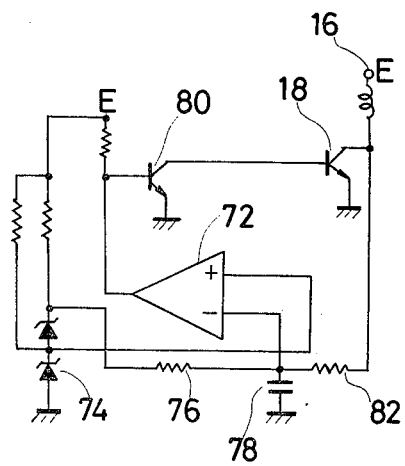
FIG. 4 is an equivalent circuit diagram of a control circuit included in the DC power supply circuit of FIG. 1.

The control circuit 70 comprises, as shown in FIG. 4, a comparator 72 and another constant voltage diode (Zener diode) 74 for applying a second reference voltage to a noninverting input terminal (+terminal) of the comparator 72. The second reference voltage determined by the constant voltage diode 74 is shown by a line ① in FIG. 5. An inverting input terminal (−terminal) of the comparator 72 is connected to receive an output signal of an integration circuit comprising a resistor 76 and a capacitor 78. An output signal of the comparator 72 is applied to a base electrode of a transistor 80. The collector electrode of the transistor 80 is connected to the base electrode of the switching transistor 18 included in the blocking oscillator circuit 10. The capacitor 78 is connected to the collector electrode of the switching transistor 18 via a resistor 82.

Figure 5:
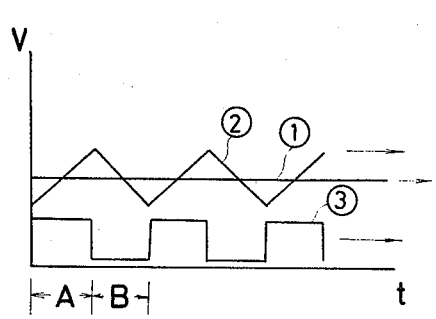
FIG. 5 is a time chart showing various signals occurring within the control circuit of FIG. 4.

When the switching transistor 18 is in the OFF state, the capacitor 78 is charged through the resistor 76. When the switching transistor 18 is in the ON state, the capacitor 78 is discharged through the resistor 82. Therefore, the inverting input terminal (−terminal) of the comparator 72 receives a sawtooth voltage input signal ② as shown in FIG. 5. The comparator 72 develops an output signal ③, as shown in FIG. 5, which is applied to the transistor 80 to control the ON/OFF operation of the switching transistor 18. More specifically, the switching transistor 18 is in the OFF state during a period A of the output signal ③, and in the ON state during a period B of the output signal ③. Accordingly, the ON period of the switching transistor 18 can be varied by varing the discharging current waveform of the sawtooth voltage input signal ② which is applied to the inverting input terminal (−terminal) of the comparator 72.

A preferred comparator 72 is "NJM2903M" manufactured by New Japan Radio Co., Ltd.

In order to vary the discharging current waveform of the sawtooth voltage input signal ②, the impedance of the resistor 82 is controlled through the use of the comparison error detected by the error detection circuit 40. That is, when the output voltage $V_0$ is higher than the first reference voltage determined by the constant voltage diode 42, the impedance of the resistor 82 is controlled to become smaller. When the output voltage $V_0$ is lower than the first reference voltage, the impedance of the resistor 82 is controlled to become higher. To achieve the above-mentioned operation, the emitter and collector of the transistor 46 of the error detection circuit 40 is connected to the resistor 82 in a parallel fashion.

The impedance between the emitter and the collector of the transistor 46 becomes small when the output voltage $V_0$ is higher than the first reference voltage determined by the constant voltage diode 42, and become large when the output voltage $V_0$ is lower than the first reference voltage. Accordingly, the ON period of the switching transistor 18 is shortened when the output $V_0$ is higher than the first reference voltage, and is lengthened when the output voltage $V_0$ is lower than the first reference voltage.

An AC output terminal 92 can develop a stable alternating signal.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A power supply circuit comprising:
   switching means for intermittently producing a DC power supply voltage;
   smoothing means for smoothing the obtained DC voltage which is produced by said switching means;
   activating means for driving said switching means in the self oscillation mode at the start of operation;
   error detection means for detecting the difference between a preselected reference voltage level and the obtained and smoothed DC voltage level, and producing an error voltage in response thereto; and
   control means responsive to an output signal of said error detection means for shortening the ON period of said switching means when said obtained and smoothed DC voltage is higher than said preselected reference voltage, and for lengthening the ON period of said switching means when said obtained and smoothed DC voltage is lower than said preselected reference voltage, said control means including variable resistance means connected to said error detection means and responsive to said error voltage for increasing the resistance of said variable resistance means when said obtained and smoothed DC voltage is lower than said preselected reference voltage and for decreasing the resistance of said variable resistance means when said obtained and smoothed DC voltage is higher than said preselected reference voltage; and
   comparator means having one input terminal connected to said variable resistance means, another input terminal connected to a further reference potential, and an output terminal connected to said switching means for changing an output voltage at said output terminal in response to the increase and the decrease of said resistance of said variable resistance means, the changing output voltage shortening and lengthening the ON period of said switching means in response thereto.

2. A DC power supply circuit comprising:
   a blocking oscillator circuit including a switching transistor for periodically producing a DC voltage;
   a smoothing condenser for smoothing an output signal of said blocking oscillator circuit, thereby providing an output voltage;
   first control means for placing said blocking oscillator circuit in the self oscillation mode at the start of operation of the DC power supply circuit;
   an error detection circuit for detecting a deviation of said output voltage from said preselected reference voltage and developing a detection output in response thereto; and
   second control means for controlling an ON period of said switching transistor in response to said detection output derived from said error detection circuit, said second control means including variable resistance means connected to said error detection circuit for increasing the resistance of said variable resistance means when said output voltage is lower than said preselected reference voltage and for decreasing the resistance of said variable resistance means when said output voltage is higher than said preselected reference voltage, and
   comparator means having one input terminal connected to said variable resistance means, another input terminal connected to a further reference potential, and an output terminal connected to said switching transistor for changing an output voltage at said output terminal in response to the increase and the decrease of said resistance of said variable resistance means, the changing output voltage controlling the ON period of said switching transistor in response thereto.

3. The DC power supply circuit of claim 2, wherein said second control means shortens said ON period of said switching transistor when said output voltage is higher than said preselected reference voltage, and lengthens said ON period of said switching transistor when said output voltage is lower than said preselected reference voltage.

4. The DC power supply circuit of claim 2 or 3, wherein said error detection circuit includes a constant voltage diode for determining said preselected reference voltage.

5. A power supply circuit in accordance with claim 1, wherein said variable resistance means comprises a first resistor connected to said switching means, a second resistor connected to said error detection means, and a transistor interconnected between said first and said second resistor, said transistor conducting when said obtained and smoothed DC voltage is higher than said preselected reference voltage, the second resistor combining with said first resistor to decrease the resistance of said variable resistance means when said transistor conducts.

* * * * *